United States Patent
Yamaoka et al.

(10) Patent No.: US 12,187,075 B2
(45) Date of Patent: Jan. 7, 2025

(54) TIRE

(71) Applicant: Sumitomo Rubber Industries, Ltd., Kobe (JP)

(72) Inventors: Hiroshi Yamaoka, Kobe (JP); Yuichi Ishigaki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 147 days.

(21) Appl. No.: 18/090,600

(22) Filed: Dec. 29, 2022

(65) Prior Publication Data

US 2023/0219373 A1    Jul. 13, 2023

(30) Foreign Application Priority Data

Jan. 7, 2022 (JP) .................................. 2022-001833

(51) Int. Cl.
*B60C 11/03* (2006.01)
*B60C 11/00* (2006.01)
*B60C 11/24* (2006.01)

(52) U.S. Cl.
CPC ........ *B60C 11/005* (2013.01); *B60C 11/0008* (2013.01); *B60C 11/24* (2013.01); *B60C 2011/0025* (2013.01); *B60C 2011/0367* (2013.01); *B60C 2011/0372* (2013.01)

(58) Field of Classification Search
CPC ............... B60C 11/0041; B60C 11/005; B60C 11/032; B60C 2011/0381; B60C 2011/0374

See application file for complete search history.

(56) References Cited

U.S. PATENT DOCUMENTS

| | | | |
|---|---|---|---|
| 5,415,215 A * | 5/1995 | Covert .................... | B60C 11/18 152/209.9 |
| 5,417,267 A | 5/1995 | Naoi et al. | |
| 2005/0039834 A1 | 2/2005 | Suzuki | |

(Continued)

FOREIGN PATENT DOCUMENTS

| | | | | |
|---|---|---|---|---|
| EP | 320143 B1 * | 5/1992 | ............ | B60C 11/01 |
| EP | 4 019 281 A1 | 6/2022 | | |

(Continued)

OTHER PUBLICATIONS

Extended European Search Report for corresponding European Application No. 22208753.8, dated May 10, 2023.

*Primary Examiner* — Cedrick S Williams
(74) *Attorney, Agent, or Firm* — Birch, Stewart, Kolasch & Birch, LLP (57) ABSTRACT

A tire comprises a tread portion having a tread surface and buttress surfaces. The buttress surfaces have inclinations such that the tread edges shift axially outwards as the tread portion is worn off. The tread rubber includes a radially outermost first rubber layer and a radially inner second rubber layer. The loss tangent $\delta 2$ of the second rubber layer is larger than the loss tangent $\delta 1$ of the first rubber layer. One of or each of the buttress surfaces is provided with an outer lateral groove. The outer lateral groove is located axially outside the tread edge when the tire is new, and when the tread portion is worn off and the tread edge shifts axially outward, the outer lateral groove is at least partially located axially inward of the tread edge.

14 Claims, 5 Drawing Sheets

(56) References Cited

U.S. PATENT DOCUMENTS

2010/0018618 A1* 1/2010 Moorhead .............. B60C 11/00
  152/209.1
2017/0050469 A1* 2/2017 Hashimoto ........... B60C 11/005
2022/0203769 A1 6/2022 Uno

FOREIGN PATENT DOCUMENTS

| JP | 2007203964 A | * | 8/2007 |
| JP | 2014213646 A | * | 11/2014 |
| JP | 2018-2008 A | | 1/2018 |

* cited by examiner

TIRE

BACKGROUND OF THE INVENTION

Field of the Invention

The present disclosure relates to a tire.

Background Art

Patent Document 1 below discloses a pneumatic tire wherein the tread rubber thereof is composed of three layers: a radially outermost cap layer, a radially inner most base layer and a middle layer therebetween, and the loss tangents of the cap layer and middle layer are specifically defined in order to improve the rolling resistance and the braking performance of the tire under wet conditions.
Patent Document 1: Japanese Patent Application Publication No. 2018-002008

SUMMARY OF THE INVENTION

Problems to be Solved by the Invention

In conventional tires, wet performance is gradually deteriorated as the tread groove volume is decreased due to wear of the tread portion.

In recent years, on the other hand, vehicle tires are required to exert good wet performance even if wear of the tread portion progresses.

The present disclosure was made in view of the above circumstances, and a primary objective of the present disclosure is to provide a tire capable of exhibiting good wet performance even if the tread portion is worn.

Means for Solving the Problems

According to the present disclosure, a tire comprises
a tread portion having a pair of tread edges, a tread surface extending between the tread edges, and a pair of buttress surface extending axially outwards from the respective tread edges,
the tread portion comprising a tread rubber including a radially outermost first rubber layer forming the tread surface and made of a first cap rubber compound, and a second rubber layer disposed on the radially inside of the first rubber layer and made of a second cap rubber compound,
wherein
the buttress surfaces have inclinations such that the tread edges shift axially outwards as the tread rubber is worn off,
a loss tangent δ2 of the second cap rubber compound is larger than a loss tangent δ1 of the first cap rubber compound,
one of, or alternatively, each of the buttress surfaces is provided with outer lateral grooves extending in a tire axial direction, and
the outer lateral grooves are arranged axially outside the tread edge from which the buttress surface extends axially outwards so that, when the tread edge shift axially outwards due to wear of the tread rubber, the outer lateral grooves are at least partially positioned axially inside the tread edge.

Effects of the Invention

Therefore, in the tire according to the present disclosure, even when the tread rubber is worn off, good wet performance is exhibited owing to the second rubber layer exposed in the tread surface and the outer lateral grooves extending across the tread edge.

DETAILED DESCRIPTION OF THE INVENTION

The present disclosure can be applied to pneumatic tires for various vehicles, e.g. passenger cars, heavy duty vehicles such as trucks and buses, and the like, but suitably applied to pneumatic tires for passenger cars.

Taking a pneumatic tire for passenger cars as an example, an embodiment of the present disclosure will now be described in detail in conjunction with accompanying drawings.

Figure 1:
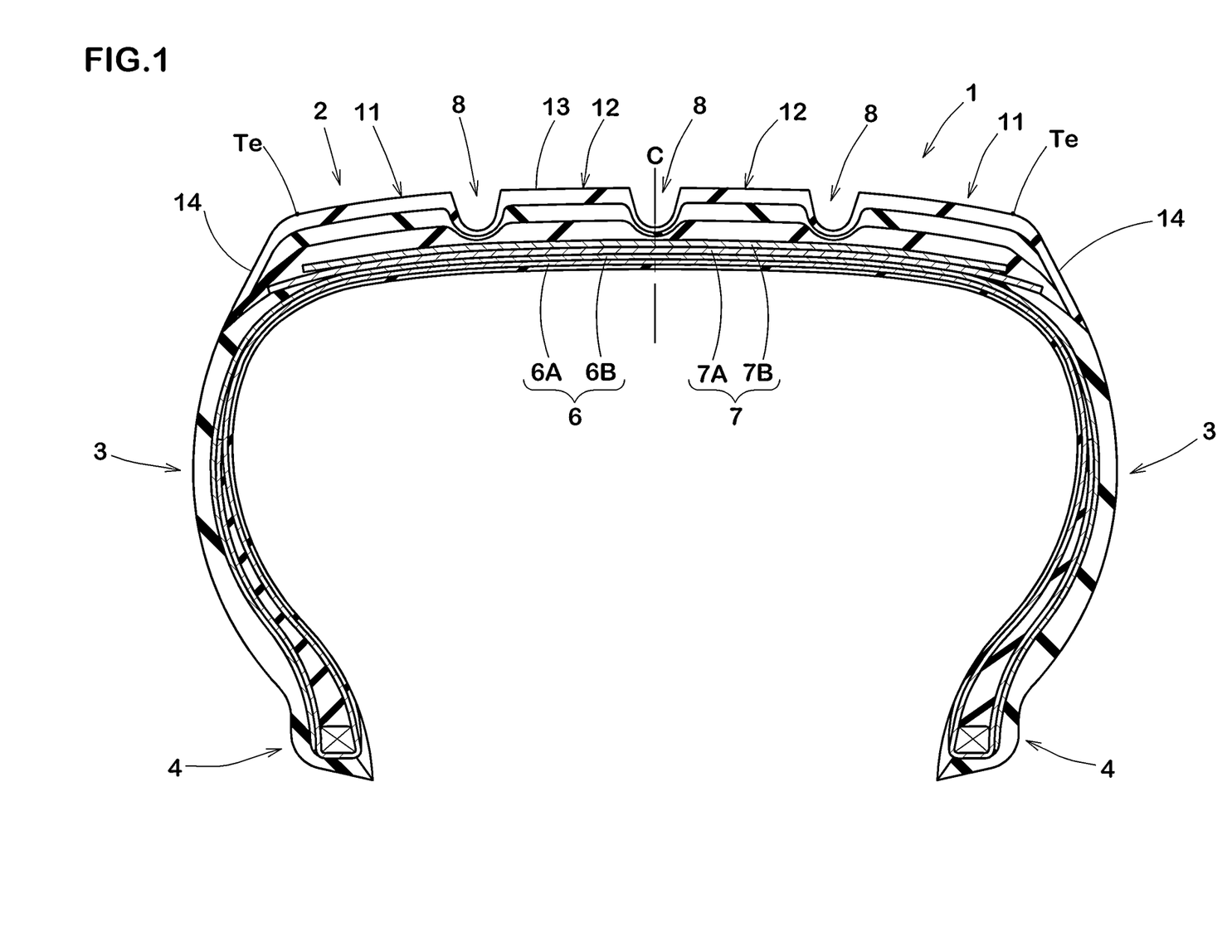
FIG. 1 is a tire meridional cross-sectional view of a tire as an embodiment of the present disclosure.

FIG. 1 shows a pneumatic tire 1 for passenger cars as an embodiment of the present disclosure under its normally inflated unloaded condition.

The pneumatic tire 1 comprises a tread portion 2 whose radially outer surface defines the tread surface 13, a pair of axially spaced bead portions 4 mounted on rim seats, a pair of sidewall portions 3 extending between the tread edges Te and the bead portions 4, a carcass 6 extending between the bead portions 4 through the tread portion 2 and the sidewall portions 3, and a tread reinforcing cord layer 7 disposed radially outside the carcass 6 in the tread portion 2.

The normally inflated unloaded condition is such that the pneumatic tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the undermentioned standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like.

The standard load is the "maximum load capacity" in JATMA, the "Load Capacity" in ETRTO, the maximum value given in the above-mentioned table in TRA or the like.

If there are no standards applicable to the pneumatic tire 1, a wheel rim, maximum air pressure and maximum tire load specified by the tire manufacturer are applied as the standard wheel rim, the standard pressure and the standard tire load.

In this application including specification and claims, various dimensions, positions and the like of the tire refer to those under the normally inflated unloaded condition of the tire unless otherwise noted.

In this embodiment, the carcass 6 is composed of two carcass plies 6A and 6B of carcass cords arranged radially at angles of 75 to 90 degrees with respect to the tire circumferential direction, and extending between the bead portions 4 through the tread portion 2 and the sidewall portions 3. For example, organic fiber cords are used as the carcass cords.

In this embodiment, the tread reinforcing cord layer 7 is composed of two plies 7A and 7B of reinforcing cords covered with topping rubber.

The reinforcing cords in each ply are arranged, for example, at an angle in a range from 10 to 45 degrees with respect to the tire circumferential direction.

As the reinforcing cords, for example, organic fiber cords and/or steel cords can be appropriately employed.

The tread portion 2 has a pair of tread edges Te, a tread surface 13 extending between the tread edges Te, and a buttress surfaces 14 extending axially outwards from each of the tread edges Te.

Here, the tread edges Te are the axial outermost edges of the ground contacting patch of the tire 1 which occurs when the tire 1 under the normally inflated unloaded condition is contacted with a horizontal flat road surface at a camber angle of 0 degrees and then loaded with 80% of the standard load.

The tread surface 13 is a radially outer surface of the tread portion 2 which comes into contact with the road surfaces during running under normal load conditions. But, when a larger load acts on the tire 1, the buttress surfaces 14 may come into contact with the road surfaces in addition to the above-mentioned tread surface 13.

The tread surface 13 near the tread edges Te and the buttress surfaces 14 are inclined such that the tread edges Te shift axially outwards as the tread portion 2 or tread rubber 2G is worn off.

Here, the expression "the tread portion 2 or tread rubber 2G is worn off" means wear occurring over the entire tread surface 13 of the tread portion 2 when the tire 1 is used in a normal manner.

In the present embodiment, the tread portion 2 is provided with
 a plurality of circumferential grooves 8 continuously extending in the tire circumferential direction and located between the tread edges Te.
Thus, the tread portion 2 is axially divided by the circumferential grooves 8, and the tread portion 2 includes a first land portion 11 and a second land portion 12 closer to the tire equator C than the first land portion 11.

In the present embodiment, the tread portion 2 includes a pair of second land portions 12 disposed one on each side of the tire equator C, and a pair of first land portions 11 respectively disposed axially outside the second land portions 12.

In the present embodiment, the tread portion 2 is axially divided into four land portions by three circumferential grooves 8. However, in the present disclosure, the tread portion 2 may be provided with four circumferential grooves 8 so as to be axially divided into five land portions.

The tread grooves disposed in the tread portion 2 include a plurality of lateral grooves (not shown) extending in a tire axial direction in addition to the above-mentioned circumferential grooves 8.

It is desirable that the tread grooves are provided with tread wear indicators (not shown) therein.

As well known in the tire art, the tread wear indicator protrudes from the bottom of the tread groove to indicate the wear limit of the tread portion 2 by the radially outer surface becoming at the same level as the tread surface of the worn tread portion.

Figure 2:
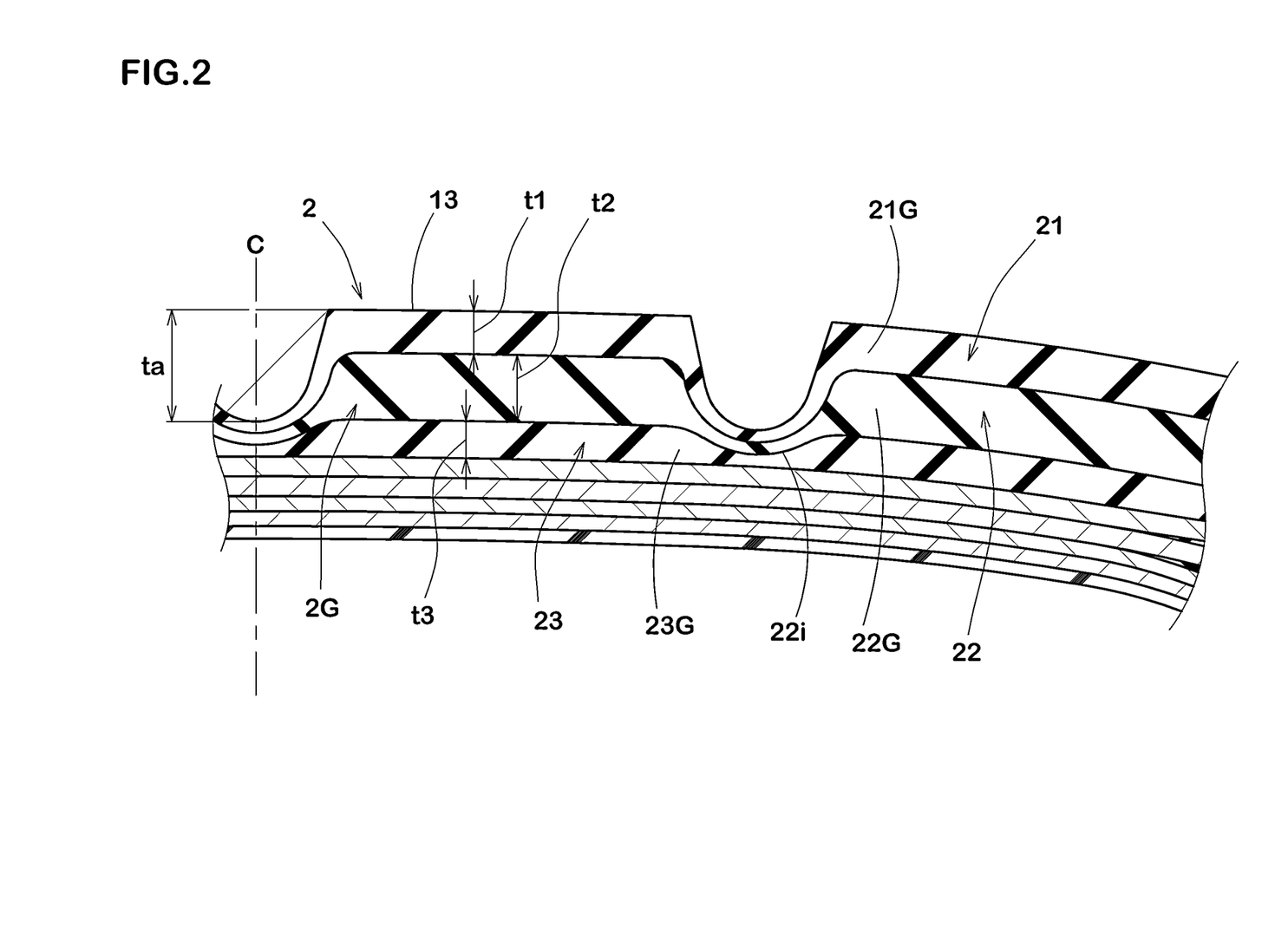
FIG. 2 is an enlarged cross-sectional view showing the tread portion of the tire shown in FIG. 1.

FIG. 2 shows an enlarged cross-sectional view of the tread portion 2.

As shown, the tread portion 2 comprises the tread rubber 2G disposed on the tread reinforcing cord layer 7.

The tread rubber 2G includes a radially outermost first rubber layer 21 and a radially inner second rubber layer 22. The first rubber layer 21 is made of a first cap rubber compound 21G and forms the tread surface 13.

The second rubber layer 22 is made of a second cap rubber compound 22G and disposed on the radially inside of the first rubber layer 21.

In the present disclosure, the loss tangent δ2 of the second cap rubber compound 22G is set to be larger than the loss tangent δ1 of the first cap rubber compound 21G since rubber having a larger loss tangent can exert a larger frictional force on wet road surfaces.

In this application including the specification and claims, the loss tangent (tan δ) refers to the value measured according to Japanese Industrial Standard (JIS) K6394, using a dynamic mechanical characteric analyzer (GABO EPLEXOR Series), under the following conditions:

Initial strain 5%, Dynamic strain amplitude +/−1%, Frequency 10 Hz, Temperature 30 degrees C., Deformation mode Tensile mode.

Figure 3:
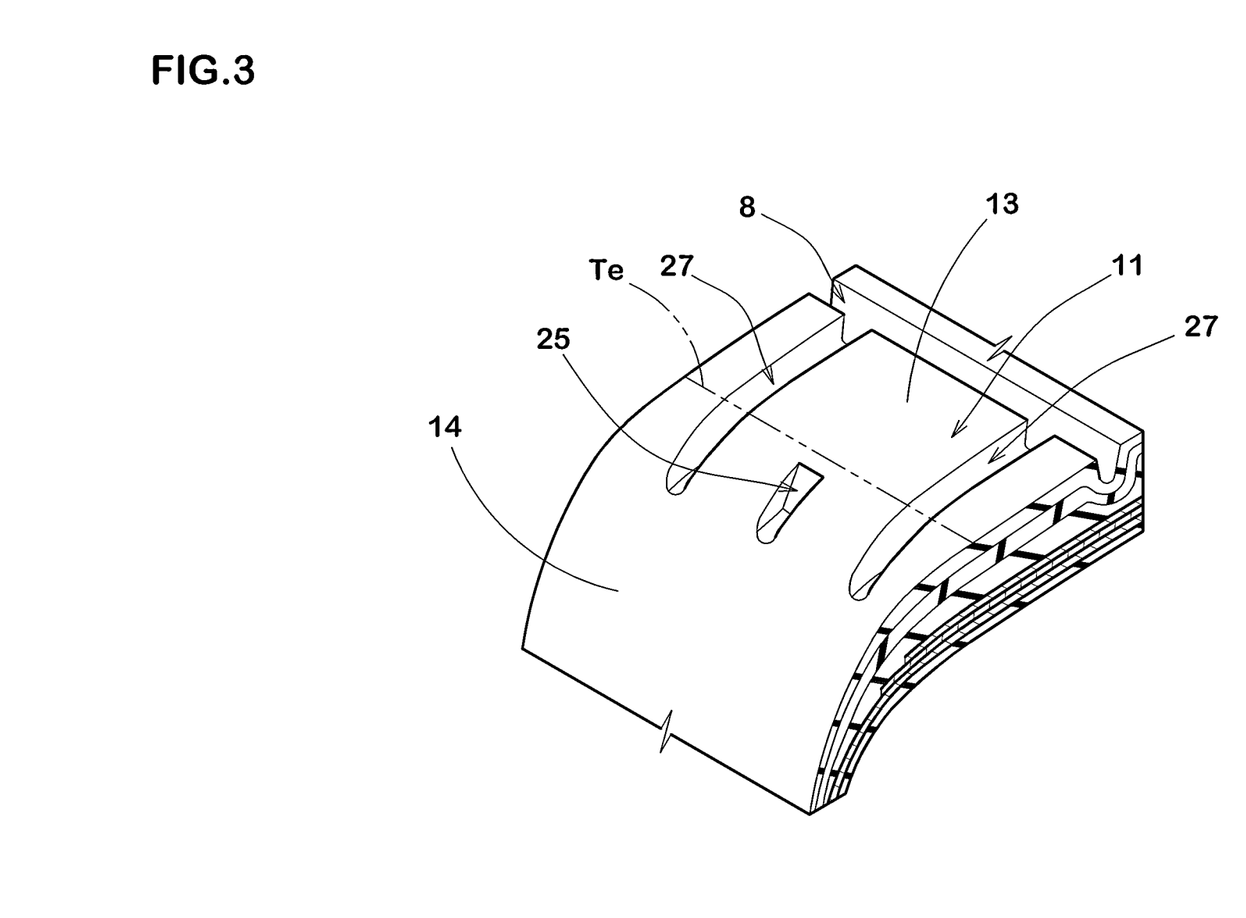
FIG. 3 is an enlarged perspective view of a part of the buttress surface of the tire shown in of FIG. 1.

FIG. 3 is a perspective view of a part of the tire shoulder near the tread edge Te showing a part of the tread surface 13 and a part of buttress surface 14.

Specifically, FIG. 3 shows the above-mentioned first land portion 11 in this embodiment which is divided by the axially outermost circumferential groove 8.

Figure 4:
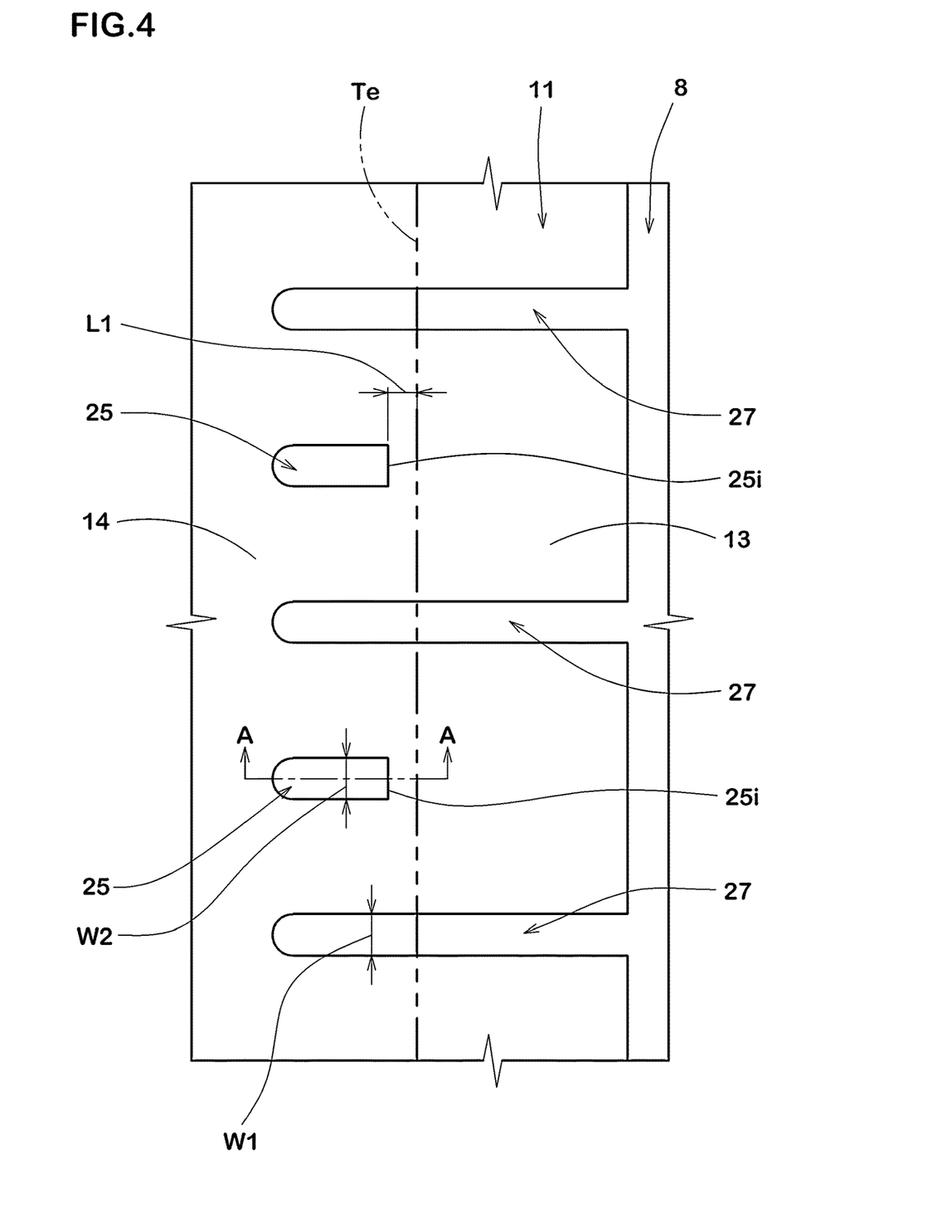
FIG. 4 is an enlarged plan view showing the buttress surface and tread surface of the tire shown in FIG. 1.

One of the buttress surfaces 14, preferably each of the buttress surfaces 14, is provided with outer lateral grooves 25 extending in a tire axial direction as shown in FIGS. 3 and 4.

When the tire is new, namely, when the tread portion 2 is not worn, the outer lateral grooves 25 are positioned axially outwards of the tread edge Te.

When the tread edge Te shifts axially outwards due to wear of the tread portion 2, at least an axially inner portion of each outer lateral groove 25 is located axially inwards of the shifted tread edge Te. The outer lateral grooves 25 are so arranged.

As a result, the tire 1 can exhibit good wet performance even when the tread portion 2 is worn as explained hereunder.

In the tire 1 of the present disclosure, the second rubber layer 22 is exposed in the tread surface as the wear of the tread portion 2 progresses.

The second cap rubber compound 22G forming the second rubber layer 22 has a larger loss tangent and can be expected to exert an excellent wet grip performance.

Therefore, the second rubber layer 22 can compensate for the deterioration of wet performance due to the decrease in tread groove volume resulting from the wear of the tread portion 2, and sufficient wet performance can be exhibited even if the tread portion 2 is worn off.

Further, in the tire 1 of the present disclosure, when the wear of the tread portion 2 progresses, at least a portion of the outer lateral groove 25 is positioned axially inward of the tread edge Te which has shifted axially outwards. Thus, the outer lateral grooves 25 exhibit drainage ability and can maintain the wet performance.

In the present disclosure, therefore, even if the tread portion 2 is worn off, sufficient wet performance can be obtained.

It is preferable that the loss tangent δ1 of the first cap rubber compound 21G is not less than 0.13, more preferably not less than 0.15, still more preferably not less than 0.18, but not more than 0.29, more preferably not more than 0.25, still more preferably not more than 0.22.

At the start of use of the tire 1, such first cap rubber compound 21G can exhibit steering stability on dry road surfaces and wet performance in a well-balanced manner.

In order to improve the steering stability on dry road surfaces and wet performance when the tread portion 2 is worn off, it is preferred that the loss tangent δ2 of the second cap rubber compound 22G is not less than 0.20, more preferably not less than 0.25, still more preferably not less than 0.28, but not more than 0.40, more preferably not more than 0.35, still more preferably not more than 0.32.

In the present embodiment, the tread rubber 2G further includes a radially innermost third rubber layer 23 made of a base rubber compound 23G.

The third rubber layer 23 is disposed on the radially inside of the second rubber layer 22.

It is preferable that the loss tangent δb of the base rubber compound 23G is smaller than the loss tangent δ1. Specifically, the loss tangent δb is not more than 0.12.

The third rubber layer 23 made of such base rubber compound 23G suppresses excessive heat generation in the tread portion 2 and helps to improve the fuel efficiency.

In the present embodiment, at least in the portion of the tread rubber 2G corresponding to the tread surface 13, in other words, the portion having a width corresponding to the tread width, the tread rubber 2G consists of the first rubber layer 21, the second rubber layer 22 and the third rubber layer 23, and no other rubber layer is included.

However, the tread rubber 2G is not limited to such three layer structure, and further rubber layers may be included as appropriate.

On the radially inner side of the tread surface 13, the first rubber layer 21, the second rubber layer 22 and the third rubber layer 23 each have a substantially constant thickness except for the vicinity of each circumferential groove 8.

In this embodiment, the maximum thickness t1 of the first rubber layer 21 is set in a range from 20% to 40% of the effective tread thickness ta.

Here, the effective tread thickness ta is generically the thickness of the tread rubber 2G from the tread surface 13 to a wear limit at which the tire 1 can maintain the minimum required dynamic performance. When the circumferential groove 8 is provided, the effective tread thickness ta is the thickness of the tread rubber 2G from the tread surface 13 to the bottom of the circumferential groove 8.

As a result, when the wear of the tread portion 2 has progressed to a certain degree, the second cap rubber compound 22G capable of exerting excellent wet grip is exposed and the wet performance can be effectively maintained.

It is preferable that when the tread portion 2 is worn by 30%, the second rubber layer 22 is at least partially exposed in the tread surface 13.

The expression "the tread portion 2 is worn by 30%" means a worn state in which the above-mentioned effective tread thickness ta has been reduced by 30%.

Thereby, the second rubber layer 22 is exposed at a relatively early stage of wear, and wet performance can be effectively maintained.

From the viewpoint of reliably maintaining wet performance, it is preferable that the second rubber layer 22 forms the tread surface 13, even when the tread rubber 2G is worn to the wear limit, that is, in a worn state in which the worn tread surface reaches to the tread wear indicator (not shown). More preferably, the radially inner surface 22i of the second rubber layer 22 is located radially inside the groove bottom of the circumferential groove 8 except for the vicinity of the circumferential groove 8. This ensures that wet performance is maintained.

The maximum thickness t2 of the second rubber layer 22 is set in a range from 50% to 70% of the effective tread thickness ta.

Thereby, the above effects can be obtained while maintaining the durability of the tread portion 2.

The maximum thickness of the third rubber layer 23 can be variously determined so that the first rubber layer 21 and the second rubber layer 22 can have the above configurations.

Preferably, the thickness t3 of the third rubber layer 23 is set in a range from 20% to 40% of the effective tread thickness ta.

As a result, it is possible to improve the fuel consumption performance while exhibiting the above-described effects.

In the present embodiment, as shown in FIGS. 3 and 4, the tread portion 2 is provided with a plurality of lateral grooves 27 extending axially outwards from the axially outermost circumferential groove 8 beyond the tread edge Te.

The lateral grooves 27 and the outer lateral grooves 25 are disposed alternately in the tire circumferential direction.

In the present embodiment, as shown in FIG. 4, the groove width W2 of the outer lateral groove 25 is set in a range from 80% to 120% of the groove width W1 of the lateral groove 27.

In the present embodiment, the axially outer ends of the outer lateral grooves 25 and the axially outer ends of the lateral grooves 27 are positioned at the substantially same axial positions as shown in FIG. 4.

The outer lateral grooves 25 are however, not limited to such arrangement.

In the present embodiment, the outer lateral grooves 25 extend parallel to the tire axial direction.

But, the outer lateral grooves 25 may be inclined with respect to the tire axial direction. In this case, the angle of the outer lateral groove 25 (the angle of the widthwise groove center line) with respect to the tire axial direction is preferably 25 to 50 degrees, more preferably 30 to 45 degrees. Such outer lateral grooves 25 can exhibit excellent drainage performance by utilizing the tire rolling.

It is preferable that, in a worn state where the second cap rubber compound 22G is at least partially exposed, the axially inner ends of the outer lateral grooves 25 are located axially inward of the tread edge Te.

It is more preferable that, in the above-mentioned state where the tread portion 2 is worn by 30%, the axially inner ends of the outer lateral grooves 25 are located axially inward of the tread edge Te.

As a result, it is possible to exhibit sufficient wet performance even if the tread portion 2 is worn off.

The axial distance L1 from the tread edge Te to the axial inner ends 25i of the outer lateral grooves 25 when the tire is new, can be appropriately determined so that the above effects can be exhibited, for example, in a range from 2.0 to 10.0 mm.

As a result, the above effects can be reliably exhibited while maintaining the steering stability on dry road surfaces when the tire is new.

Figure 5:
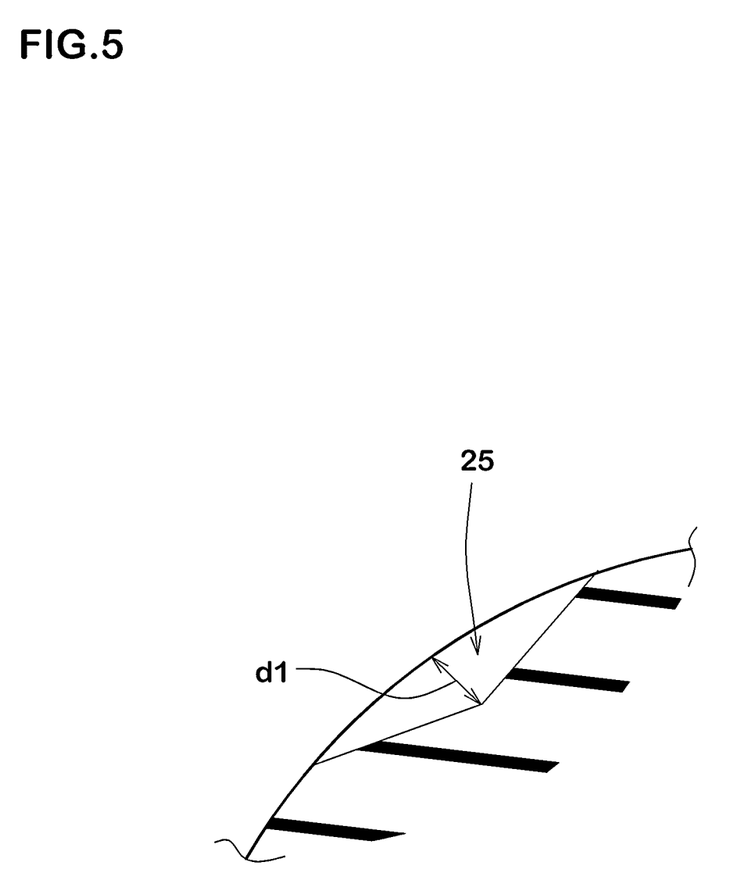
FIG. 5 is a cross-sectional view taken along line A-A of FIG. 4.

FIG. 5 is a cross-sectional view taken along line A-A of FIG. 4 showing the cross-sectional shape of the outer lateral groove 25 along the length direction thereof.

As shown, the outer lateral grooves 25 has a maximum depth d1 which is, for example, in a range from 2.0 mm to 4.0 mm. The depth of the outer lateral groove 25 is gradually decreased toward the axially inner end and toward the axially outer end from a middle position at which the maximum depth d1 occurs.

As a result, the cross-sectional shape of the outer lateral groove 25 is generally an obtuse triangle with the obtuse-angled vertex at the middle position with the maximum depth d1 although the side opposite to the obtuse-angled vertex is slightly curved in this example. As a result, the volume of the tread rubber in the buttress portion (a portion defining the buttress surface 14) is maintained, and the durability of this portion can be maintained while obtaining the above effects.

While detailed description has been made of a preferable embodiment of the present invention, the present invention can be embodied in various forms without being limited to the illustrated embodiment.

STATEMENT OF THE PRESENT DISCLOSURE

The present disclosure is as follows:

Disclosure 1: A tire comprising:
  a tread portion having a pair of tread edges, a tread surface extending between the tread edges and a pair of buttress surfaces extending axially outwardly from the respective tread edges,
  the tread portion comprising a tread rubber including a radially outermost first rubber layer forming the tread surface and made of a first cap rubber compound, and a second rubber layer disposed on the radially inside of the first rubber layer and made of a second cap rubber compound,
  wherein
    the buttress surfaces have inclinations such that the tread edges shift axially outwards as the tread rubber is worn off,
    a loss tangent δ2 of the second cap rubber compound is larger than a loss tangent δ1 of the first cap rubber compound,
    one of, or alternatively, each of the buttress surfaces is provided with an outer lateral groove extending in a tire axial direction, and
    the outer lateral groove is arranged axially outside the tread edge from which the buttress surface extends axially outwards so that, when the tread edge shifts axially outwards due to wear of the tread rubber, the outer lateral groove is at least partially positioned axially inside the tread edge.

Disclosure 2: The tire according to Disclosure 1, wherein
  the tread rubber includes a third rubber layer disposed on the radially inside of the second rubber layer and made of a base rubber compound, and
  a loss tangent δb of the base rubber compound is smaller than the loss tangent δ1 of the first cap rubber compound.

Disclosure 3: The tire according to Disclosure 1 or 2, wherein
  the angle of the outer lateral groove with respect to the tire axial direction is in a range from 30 to 45 degrees.

Disclosure 4: The tire according to Disclosure 1, 2 or 3, wherein
  in a worn state in which the second cap rubber compound is exposed and the tread edge shifts axially outwards, an axially inner end of the outer lateral groove is located axially inwards of the tread edge.

Disclosure 5: The tire according to Disclosure 1, 2 or 3, wherein
  an axially inner end of the outer lateral groove is located axially inwards of the tread edge when the tread portion is worn by 30%.

Disclosure 6: The tire according to Disclosure 5, wherein
  in the state in which the tread portion is worn by 30%, the second rubber layer is at least partially exposed in the tread surface.

Disclosure 7: The tire according to any one of Disclosures 1 to 6, wherein
  the tread portion is provided with a groove which is provided therein with a tread wear indicator protruding from the bottom of the groove, and
  in a worn state in which wear of the tread portion reaches to the tread wear indicator, said second rubber layer forms the tread surface.

Disclosure 8: The tire according to any one of Disclosures 1 to 7, wherein
  the maximum depth of the outer lateral groove is in a range from 2.0 to 4.0 mm.

Disclosure 9: The tire according to any one of Disclosures 1 to 8, wherein
  the depth of the outer lateral groove increases from the axially inner end thereof toward the axially outside of the tire.

DESCRIPTION OF THE REFERENCE SIGNS 2 tread portion
13 tread surface
14 buttress surface
21 first rubber layer
21G first cap rubber compound
22 second rubber layer
22G second cap rubber compound
25 outer lateral groove
Te tread edge

The invention claimed is:
1. A tire comprising:
a tread portion having a pair of tread edges, a tread surface extending between the tread edges and a pair of buttress surfaces extending axially outwardly from the respective tread edges, the tread portion comprising a tread rubber including a radially outermost first rubber layer forming the tread surface and made of a first cap rubber compound, and a second rubber layer disposed on the radially inside of the first rubber layer and made of a second cap rubber compound,
wherein
  the buttress surfaces have inclinations such that the tread edges shift axially outwards as the tread rubber is worn off,
  a loss tangent δ2 of the second cap rubber compound is larger than a loss tangent δ1 of the first cap rubber compound, one of, or alternatively, each of the buttress surfaces is provided with outer lateral grooves extending in a tire axial direction, and the outer lateral grooves are arranged axially outside the tread edge from which the buttress surface extends axially outwards so that, when the tread edge shifts axially outwards due to wear of the tread rubber, the outer lateral grooves are at least partially positioned axially inside the tread edge, and wherein in a new state of the tire in which the tread portion is not worn, an axially inner end of each of the outer lateral grooves is positioned at an axial distance L1 of 2.0 to 10.0 mm axially outward from the tread edge; and each of the outer lateral grooves has a maximum depth at a middle position in the groove length direction, and the groove depth decreases continuously from the middle position toward the axially inner end and axially outer end of the outer lateral groove, the outer lateral grooves each have: a first circumferential edge on one side in the tire circumferential direction; a second circumferential edge on the other side in the tire circumferential direction; an axially outer edge connecting between an axially outer end of the first circumferential edge and an axially outer end of the second circumferential edge; and an axially inner edge connecting between an axially inner end of the first circumferential edge and an axially inner end of the second circumferential edge, and in a plan view of the tread portion, the first circumferential edge and the second circumferential edge linearly extend in parallel with each other, and the axially outer edge extends in an arc shape.

2. The tire according to claim 1, wherein in a worn state in which the second cap rubber compound is exposed to the tread surface and the tread edge shifts axially outwards, the axially inner end of each outer lateral groove is located axially inwards of the shifted tread edge.

3. The tire according to claim 1, wherein
the tread portion is provided with a groove provided therein with a tread wear indicator protruding from the bottom of the groove, and
in a worn state in which wear of the tread portion reaches to the tread wear indicator, said second rubber layer is exposed and forms the tread surface.

4. The tire according to claim 1, wherein the maximum depth of each outer lateral groove is in a range from 2.0 to 4.0 mm.

5. The tire according to claim 1, wherein said first circumferential edge and second circumferential edge are parallel with the tire axial direction.

6. The tire according to claim 1, wherein the axially inner edge of each outer lateral groove extends linearly in the plan view of the tread portion.

7. The tire according to claim 1, wherein each of the outer lateral grooves has a groove bottom extending linearly from the axially inner end and axially outer end of the outer lateral groove to an intermediate position therebetween at which the maximum depth occurs.

8. The tire according to claim 1, wherein in a worn state of the tread portion in which an effective tread thickness has been reduced by 30%, the axially inner end of each outer lateral groove is located axially inwards of the tread edge under the worn state, where the effective tread thickness is a thickness of the tread rubber from the tread surface to the bottom of a circumferential groove.

9. The tire according to claim 8, wherein in the worn state in which the tread portion is worn by 30%, the second rubber layer is at least partially exposed in the tread surface.

10. The tire according to claim 1, wherein
the tread portion is provided with additional lateral grooves (27) extending from the axially inside to axially outside of the tread edge, and
the additional lateral grooves (27) and the outer lateral grooves (25) are arranged alternately in the tire circumferential direction.

11. The tire according to claim 10, wherein the axially outer ends of the outer lateral grooves (25) and axially outer ends (270) of the additional lateral grooves (27) are located at substantially same axial positions.

12. The tire according to claim 1, wherein
the tread rubber includes a third rubber layer disposed on the radially inside of the second rubber layer and made of a base rubber compound, and
a loss tangent δb of the base rubber compound is smaller than the loss tangent δ1 of the first cap rubber compound.

13. The tire according to claim 12, wherein in a worn state in which the second cap rubber compound is exposed to the tread surface and the tread edge shifts axially outwards, the axially inner end of each outer lateral groove is located axially inwards of the shifted tread edge.

14. The tire according to claim 12, wherein in a worn state of the tread portion in which an effective tread thickness has been reduced by 30%, the axially inner end of each outer lateral groove is located axially inwards of the tread edge under the worn state, where the effective tread thickness is a thickness of the tread rubber from the tread surface to the bottom of a circumferential groove.

* * * * *